United States Patent
Chakra et al.

(10) Patent No.: US 10,970,637 B2
(45) Date of Patent: Apr. 6, 2021

(54) ANALYTICS GATHERING OF DISCOVERED AND RESEARCHED INSIGHTS

(71) Applicant: International Business Machines Corporation, Armonk, NY (US)

(72) Inventors: Al Chakra, Apex, NC (US); Michael P. Clarke, Ellenbrook (AU); Matt R. Hogstrom, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 986 days.

(21) Appl. No.: 15/595,998

(22) Filed: May 16, 2017

(65) Prior Publication Data
US 2018/0336475 A1 Nov. 22, 2018

(51) Int. Cl.
G06N 5/02 (2006.01)
G06N 5/04 (2006.01)
G06F 11/00 (2006.01)

(52) U.S. Cl.
CPC ............ G06N 5/022 (2013.01); G06F 11/00 (2013.01); G06N 5/04 (2013.01)

(58) Field of Classification Search
CPC ............ G06F 11/3466; G06F 11/0706; G06F 11/2257; G06F 11/0793; G06F 2201/86; G06N 5/04; G06N 20/00; G06N 5/022
See application file for complete search history.

(56) References Cited

U.S. PATENT DOCUMENTS

| | | | |
|---|---|---|---|
| 5,581,663 A | 12/1996 | Zlotin et al. | |
| 7,337,090 B1 * | 2/2008 | Yemini | G06F 11/2257 702/181 |
| 9,582,344 B2 * | 2/2017 | Chen | G06F 11/3612 |
| 10,585,737 B2 * | 3/2020 | Chakra | G06F 11/0787 |
| 2007/0168343 A1 | 7/2007 | Best et al. | |

(Continued)

OTHER PUBLICATIONS

Hoskinson, "Creating the Ultimate Research Assistant", IT Systems Perspectives, vol. 38, Issue: 11, pp. 97-99, Nov. 2005, IEEE Computer Society. URL: http://ieeexplore.ieee.org/document/1541890/.

(Continued)

*Primary Examiner* — Paulinho E Smith
(74) *Attorney, Agent, or Firm* — Cantor Colburn LLP; Teddi Maranzano

(57) ABSTRACT

A computer-implemented method for optimizing research of an abstracted issue with a plurality of analytics engines is described. The method includes receiving a problem report at an analytics engine controller. The problem report includes symptoms of a problem in a computing system. The analytics engine forwards the problem report to a research optimization engine that abstracts one or more issues associated with the problem based on the symptoms of the problem. The research optimization engine then obtains anomaly research data for one or more of diagnosing the problem and fixing the problem. The anomaly research data is based on the one or more abstracted issues. The research optimization engine associates the abstracted issues with corresponding portions of the anomaly research data, then assigns the abstracted issues and corresponding portions of the anomaly research data to at least one of the plurality of analytics engines.

20 Claims, 5 Drawing Sheets

(56) References Cited

U.S. PATENT DOCUMENTS

| | | |
|---|---|---|
| 2011/0196865 A1 | 8/2011 | Eggink et al. |
| 2013/0018957 A1 | 1/2013 | Parnaby et al. |
| 2014/0172544 A1 | 6/2014 | Rabkin |
| 2015/0006519 A1 | 1/2015 | Jain et al. |
| 2015/0178371 A1 | 6/2015 | Seth et al. |
| 2016/0350173 A1 | 12/2016 | Ahad |

OTHER PUBLICATIONS

Robinson, J. Alan et al. "Handbook of Automated Reasoning", Abstract Only, retrieved at: https://www.amazon.com/Handbook-Automated-Reasoning-Alan-Robinson/dp/026218222X; downloaded Aug. 26, 2020; 9 pgs.

Thomas, Steven, Rachel "Automated Research Assistant", retrieved at: http://bioquest.org/peer2011/wp-content/uploads/2011/08/Automated-Research-Assistant.pdf; downloaded Aug. 26, 2020; 6 pgs.

Wikipedia "Query expansion" retrieved at: https://en.wikipedia.org/wiki/Query.expansion; downloaded Aug. 26, 2020; 4 pgs.

Wos, Larry "Journal of Automated Reasoning", Journal of Automated Reasoning 3 (1987); cover, pp. 433-435; 4 pgs.

\* cited by examiner

US 10,970,637 B2

ANALYTICS GATHERING OF DISCOVERED AND RESEARCHED INSIGHTS

BACKGROUND

The present invention relates to a cognitive analytics engine, and more specifically, to dynamic cognitive analytics gathering of discovered and researched insights.

Analytics refers to the systematic analysis of data and is increasingly used in a variety of areas to discern patterns and gain insight into actions suggested by those patterns. For example, analytics are increasingly used in the management of computer systems to analyze and address issues arising in memory and other operational areas. In this context, analytics engine is a term that refers to the implementation of analysis tools that receive information to facilitate the management of computer systems.

When multiple analytics engines are tasked with analysis of different aspects of a problem, the analytics engines will most likely request data from the same resources, and in some instances, request the same data. The redundant requests and data transmissions can increase computational time and time needed for task responses. The inefficiencies caused by request and data redundancy can diminish the ability of the data sources to respond in a timely manner.

SUMMARY

According to an embodiment of the present invention, a computer-implemented method for optimizing research is described. The method optimizes research of an abstracted issue for transmitting to a plurality of analytics engines. The method includes receiving a problem report at an analytics engine controller. The problem report includes symptoms of a problem in a computing system. The analytics engine forwards the problem report to a research optimization engine that abstracts one or more issues associated with the problem based on the symptoms of the problem in the problem report. The research optimization engine then obtains anomaly research data for one or more of diagnosing the problem and fixing the problem. The anomaly research data is based on the abstracted issues. The research optimization engine associates the abstracted issues with corresponding portions of the anomaly research data, then assigns the abstracted issues and corresponding portions of the anomaly research data to at least one of the plurality of analytics engines.

According to another embodiment, a system for optimizing research of an abstracted issue for a plurality of analytics engines is described. The system includes a plurality of analytics engines, and an analytics engine controller running an analytics optimization engine. The processor is operatively connected to the plurality of analytics engines. The processor is configured to receive a problem report that includes symptoms of a problem in a computing system. The processor is configured to abstract one or more issues associated with the problem based on the symptoms of the problem, and obtain research data that gives information about an anomaly for one or more of diagnosing the problem and fixing the problem. The anomaly research data is based on the one or more abstracted issues. The processor associates the abstracted issues with corresponding portions of the anomaly research data, then assigns the abstracted issues and corresponding portions of the anomaly research data to at least one of the plurality of analytics engines.

According to another embodiment, a computer program product includes a computer-readable storage medium. The computer-readable storage medium includes program instructions that are executable by a processor to cause a computer to perform a method for optimizing research. The method optimizes research of an abstracted issue for transmitting to a plurality of analytics engines. The method includes receiving a problem report at an analytics engine controller. The problem report includes symptoms of a problem in a computing system. The analytics engine forwards the problem report to a research optimization engine that abstracts one or more issues associated with the problem based on the symptoms of the problem. The research optimization engine then obtains anomaly research data for one or more of diagnosing the problem and fixing the problem. The anomaly research data is based on the one or more abstracted issues. The research optimization engine associates the abstracted issues with corresponding portions of the anomaly research data, then assigns the abstracted issues and corresponding portions of the anomaly research data to at least one of the plurality of analytics engines.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
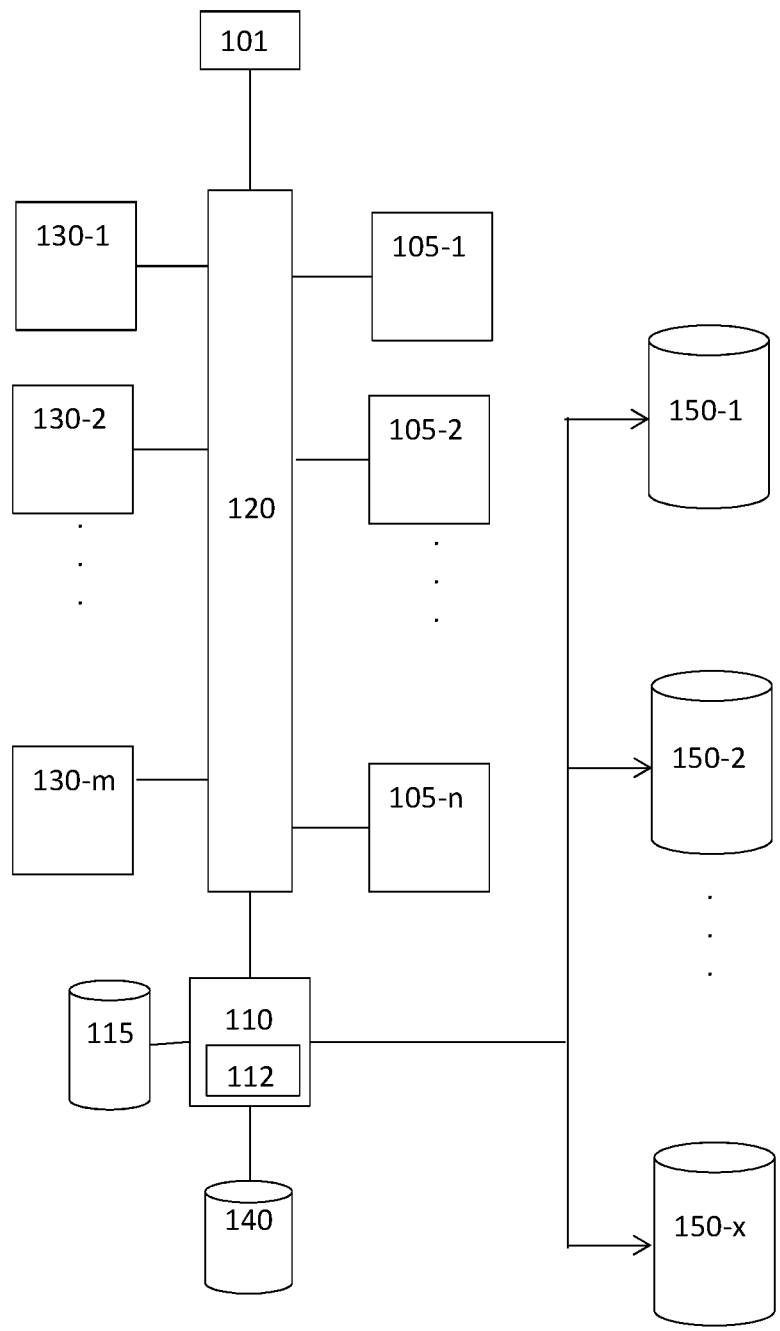
FIG. 1 is a block diagram of the architecture that includes the analytics engine controller and a research optimization engine according to embodiments of the present invention.

As previously noted, one implementation of analytics engines involves receiving information and performing analytics to facilitate management of computer systems. For example, in a data center, one or more analytics engines monitor information technology (IT) operations and can give insight to customers regarding potential hacking based on a threshold number of invalid password attempts being exceeded or a potential for a database running out of memory based on monitoring usage, for example. Analytics engines can also provide fixes or information related to fixes for problems that arise in the computer systems. In prior analytics engines, problems are detected, a problem report is generated, and the problem report is passed to multiple analytics engines for parallel assessment. For example, each analytics engine may analyze a different aspect of the same detected problem. Each of the cognitive engines drives its own research, queuing on the same data providers (and sometimes for the same data). Each of the cognitive engines waits in turn for the requested information and provides proposed solutions to the problem(s) abstracted in the problem report. The analytics engines may experience conflict when queuing for the same resources and the same resource providers.

Problems in computing systems may have one cause or may have multiple causes. The causes may be related, or they may be contemporaneous and unrelated. In other aspects, the causes of a problem may not be contemporaneous at all, but rather be have several intervening factors separating the cause and the effect (the anomaly). Stated in another way, a cause of the problem can be indicated by an occurrence of the anomaly. It should be noted here that associating some anomalies with the various causes of a problem, and thus, a solution to the problem, may be a task that is not currently suited (or even possible) for an unassisted human actor. Because complex computing systems often include various interconnecting systems and subsystems, aspects of the computing system can, together, result in an unwanted artifact (an anomaly) that may alone or in connection with other anomalies cause a systematic problem. When the source or the root cause of the anomaly is separated from the anomaly itself by multiple intervening factors or steps, a human actor may not be able to make a connection between the cause of the anomaly and the anomaly itself, and even more remotely, make a connection between the anomaly and the actual root causes. In other aspects, when multiple unrelated causes of a problem are contemporaneous but completely unrelated, a convergence of circumstances may result in multiple anomalies which, any on their own, would not result in a systematic problem, but together result in the manifestation of the problem.

Analytics engines, as described herein, are suited for (among other things) diagnosing and resolving problems of this sort, because they can iteratively and systematically determine minute patterns and/or associations between seemingly unrelated causes, and use these associations to diagnose and resolve the underlying issues. They are also suited for connecting multiple intervening factors that would likely go undetected by a human actor alone. Moreover, multiple analytics engines working in conjunction (with each handling a specialized portion of the detection and resolution) may each perform detection, analysis, and resolution steps that are either impossible for human actors alone because of the volume of data that is analyzed, or so complex and cumbersome that the man hours required for diagnosis and implementation of a solution is untenable. Accordingly, embodiments of the present invention describe a technical problem and a technical solution to the above-described technical problems that are far more than mental abstraction or mathematical relationships.

Turning now to an overview of the present invention, the several embodiments detailed herein pertain to an analytics engine controller. The analytics engine controller is an analytics engine that communicates with the one or more other analytics engines that manage a cluster of computers. The analytics engine controller stores problems and corresponding solutions for future reference. The analytics engine controller correlates related problems to generate combination problems. Individual and correlated problems are abstracted by the analytics engine controller in order to generalize the specific previous problem and facilitate matching future problems with the abstracted issues. The problems and abstracted issues can be shared by the analytics engine controller at different levels.

One or more embodiments of the systems and methods detailed herein relate to recognizing interrelated issues. The analytics engine controller includes a research assistant (also referred to as a research optimization engine) configured with a that hypothesizes a correlation between an anomaly associated with the problem, and data associated with the anomaly. After determining what information is needed for further analysis, research, diagnosis, and resolution, the research optimization engine obtains the information from various sources and makes a determination of which connected analytics engines are best suited to resolve various aspects of the problem. Each aspect of the problem has associated with it research data that the optimization engine has obtained. The research optimization engine forwards the abstracted issue (or portion of the problem) and data associated with that particular aspect of the problem, to multiple analytics engines each suited to perform further research based on analysis made with the research data, diagnose the source(s) of the problem, and propose one or more resolutions to the problem. The match made by the research optimization engine accounts for one or more specialties of analysis for which each of the analytics engines is suited.

While hypothesizing and verifying correlations among problems related to the management of a cluster of computer systems is discussed specifically for explanatory purposes, the analytics engine controller according to the one or more embodiments described herein can be applied in any area to find correlations among problems and events.

Additional embodiments of the systems and methods detailed herein relate to abstracting issues. Previously encountered problems are generalized or abstracted by the analytics engine controller such that they can be identified based on subsequent symptoms even when those symptoms are not identical to ones that were previously encountered. A searchable archive of abstracted issues is generated. The archive can be organized into different levels such that a hierarchy of search is established for searching subsequent symptoms to identify an issue. The search facilitates failure prediction and insight generation for issue resolution.

Further embodiments of the systems and methods detailed herein relate to the analytics engine controller determining whether and with whom to share abstracted issues. Different hierarchical levels are defined for the different sharing partners (e.g., other systems of the same enterprise as that of the analytics engine controller, global database). A variety of considerations such as contracts, service agreements, and confidentiality agreements can be used to make a determination of which abstracted issues can be shared and at which hierarchical levels. Once an anomaly has been detected, it will be passed to a research assistant (e.g., a research optimizing engine) to be researched before it is passed to one or more cognitive engines for assessment. This can provide a faster response from the cognitive engines because they will have been provided with enough contextual data for them to make a good analysis of the problem without redundant and competing requests for information from the same sources. Embodiments of the present invention should reduce overall processing costs and computational overhead.

FIG. 1 is a block diagram of the architecture that includes the analytics engine controller 110 according to one or more embodiments. A cluster of computer systems 130-1 through 130-*m* (generally referred to as 130) communicate over a bus 120 with analytics engines 105-1 through 105-*n* (generally referred to as 105), an operator 101, and the analytics engine controller 110. The analytics engine controller 110 monitors data traffic on the bus 120.

FIG. 2 is a process flow of a computer-implemented method for optimizing research of an abstracted issue for a plurality of analytics engines 105, according to one or more embodiments. The processes shown in FIG. 1 can be performed continuously or periodically. In alternate embodiments, the processes at blocks 204 through 218 can be based on a problem report being received at block 202. The processes are performed by analytics engine controller 110. As previously noted, analytics engine controller 110 is an analytics engine itself.

As a prior step to block 202, one or more analytics engines 105 has declared the presence of one or more problems in one or more computer systems 130. Analytics engine controller 110 may have searched a local database 115 to determine if the problems or abstracted issues, which are generalized descriptions of the problems that are generated by one or more of the analytics engines 105 regarding the problems, have a match in the database 115. A match can facilitate expedited problem resolution or insight into an impending failure. Prior to searching the database 115, the analytics engine controller 110 may obtain information about the computer software that is run by the cluster of computer systems 130 from a resource database 140. This information can narrow the search or provide an indication of which matches are most relevant.

By way of a general background of capability of engine controller 110, and although a full description of which is outside the scope of the present description, it is notable that the analytics engine controller 110 is configured to hypothesize a correlation among two or more problems and determine a correlation score upon one or more of those problems being resolved. Correlated problems can be addressed in the future as a new, combination problem. The correlation facilitates further insight into problems that would previously have been addressed individually. In some aspects, engine controller 110 may have hypothesized a correlation between two or more problems received in previous problem reports.

Accordingly, analytics engine controller 110 can share problems and abstracted issues, along with corresponding solutions, for storage in other databases 150-1 through 150-x (generally referred to as 150). The other databases 150 can be associated with different levels sharing. For example, the other database 150-1 can be associated with a different enterprise than the one that operates the cluster of computer systems 130. The other database 150-2 can be a service database associated with organizations that produce software products that are run in the cluster of computer systems 130. The other database 150-x can be a shared, public global database.

Research optimization engine 112 (hereafter "optimization engine 112") is shown in FIG. 1 to be part of analytics engine controller 110. In other embodiments, optimization engine 112 operates as a separate entity to analytics engine controller 110. For example, optimization engine 112 may be a resource operating as part of a cloud computing network. In other aspects, optimization engine 112 may be a separate appliance operatively connected to analytics engine controller. In another embodiment, analytics engine controller may function as part of any one or more of analytics engines 105.

Figure 2A:
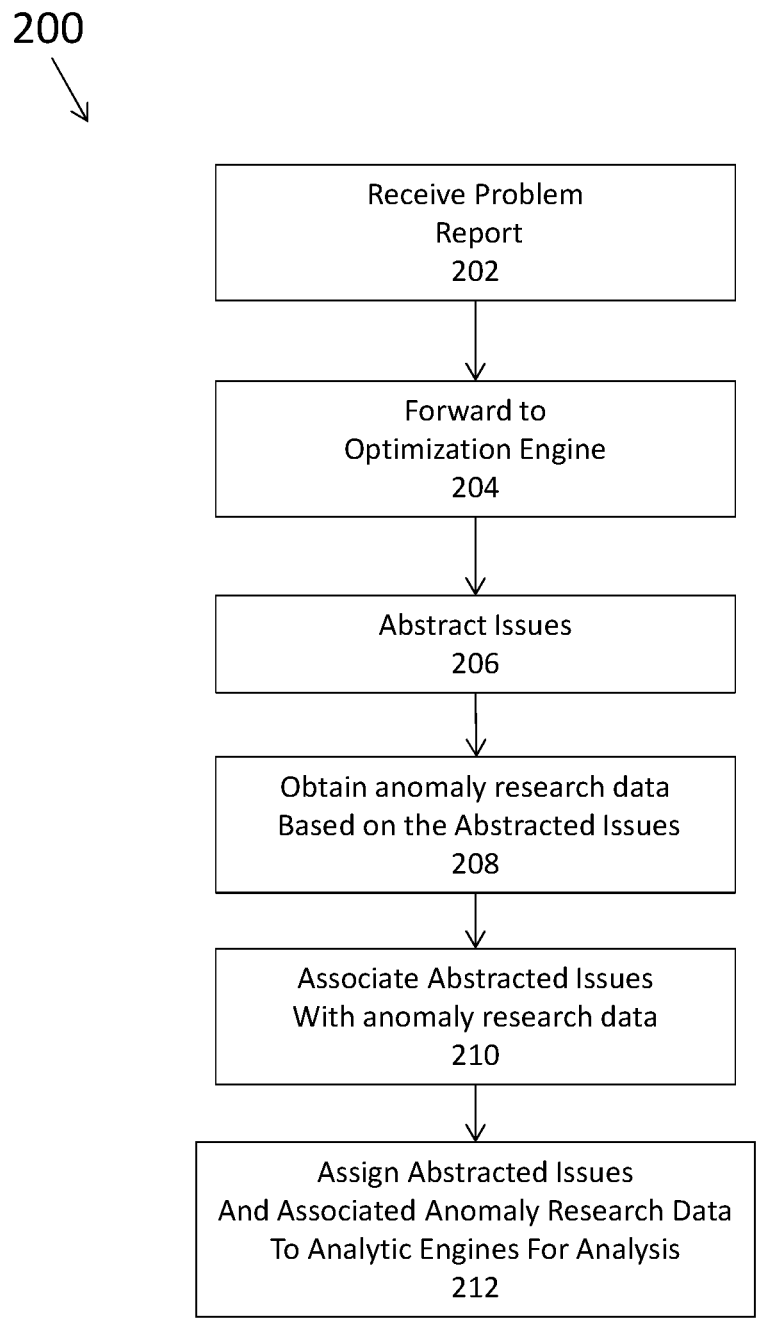
FIG. 2A is a process flow of a computer-implemented method for optimizing research of an abstracted issue for a plurality of analytics engines according to embodiments of the present invention.

FIG. 2A illustrates a process flow of a computer-implemented method 200 for optimizing research of an abstracted issue for a plurality of analytics engines 105, according to embodiments of the present invention. Referring now to FIG. 2A, at block 202, analytics engine controller 110 receives a problem report. Receiving a problem report can include, for example, receiving a problem report that includes information that can be used for further research, diagnosis, and resolution of a computing problem.

Figure 3A:
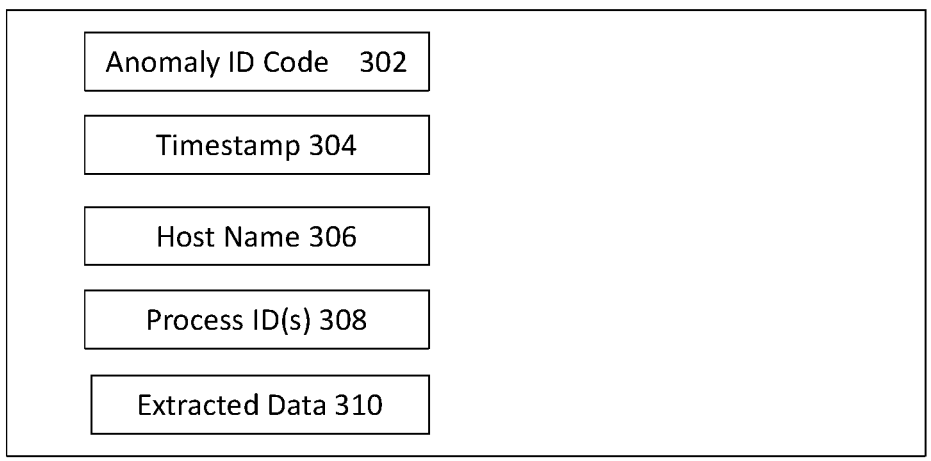
FIG. 3A is a block diagram of an exemplary problem report according to embodiments of the present invention.

FIG. 3A depicts an exemplary problem report typically received by an analytics engine 105. Referring briefly to FIG. 3, a problem report 300 is illustrated according to one embodiment. Problem report 300 can include various portions of information that describe a computing problem in a computing system. Problem report 300 can be illustrative of the type received by analytics engine controller 110.

As shown in FIG. 3A, problem report 300 includes one or more symptoms of the problem. For example, problem report can include anomaly identification (ID) 302 indicating a known anomaly that causes a problem in a computing system. In other aspects, the symptoms can include a timestamp 304 of the anomaly, a host name 306 of the system experiencing the anomaly and/or the one or more process ID(s) 308 that were running on the host system during an occurrence of the anomaly. In other aspects, the symptoms may be embodied in the extracted data 310 that may be included in problem report 300. The problem report in FIG. 3 is exemplary only. Embodiments of the present invention may include some, all, and/or additional information indicative of symptoms.

Receiving problem report 300 at block 202 refers to receiving real-time problem logs rather than historical data. The problem descriptions can be in the form of traffic on the bus 120 that is generated by one of the analytics engines 105. The problem descriptions can be error logs output by one of the computer systems 130 in the cluster being managed by the analytics engine controller 110 (embodied as extracted data 322).

In one embodiment, analytics engine controller 110 receives information indicative of a problem (block 202), and instead of broadcasting the problem report 300 to analytics engines 105 for their independent analyses of the problem, analytics engine controller 110 forwards it to optimization engine 112, as shown in block 204. Optimization engine 112, which may be operating on analytics engine controller 110, can assess the symptoms of the problem, abstract the issues from problem report 300, and do independent research to obtain anomaly research data that indicates (or gives clues to) the source(s) of the problem. The research data may also give clues to areas of additional research to be explored by one or more assigned analytics engines 105. According to one or more embodiments, having research performed in advance by optimization engine 112 can provide a faster response from the cognitive engines (analytics engines 105) as compared to broadcasting problem report 300 to all of analytics engines 105 for parallel research, because the analytics engines 105 will have been provided with enough contextual data for them to make a thorough analysis of the situation. This method can reduce overall processing costs and computational overhead across all of the analytics engines 105 when comparing the processing costs in the aggregate using previous methods.

Referring again to FIG. 2, in one aspect, after analytics engine controller 110 receives problem report 300 at block 202, analytics engine controller 110 forwards problem report 300 to optimization engine 112, as shown in block 204.

At block 206, optimization engine 112 abstracts one or more issues associated with the problem based on the symptoms of the problem included in problem report 300. Abstracting the issues includes processing the problems that are curated, correlated, or archived individually, according to one or more embodiments. The curation, correlation, and archiving may be performed as prior steps not considered in detail herein. Curated problems can be stored in a local database 115 or in a different area of memory accessible to optimization engine 112.

The process of abstracting includes generalizing each problem. One way of generalizing problems in an error log, for example, is by removing incident-specific information from the error log or other report detailing the problem. Incident-specific information includes the job number, job name, or other identifying information.

Abstraction can be performed at different hierarchical levels and abstracted issues can be stored at different hierarchical levels. For example, at one hierarchical level, an abstracted issue can include the type of address space that is experiencing the problem while stripping out the address space identifier (ASID). At another hierarchical level, a more generalized abstracted issue can have the address space information removed, as well.

Table 1 gives examples of problems and their abstractions. Simplified problem records are used to indicate the types of information that can be retained or discarded to achieve abstraction at different levels. The problem and abstracted issued also includes anomaly research data. Anomaly research data indicates (or gives clues too) the source(s) of the problem. Although not specifically identified as such, anomaly research data may be, for example, a particular transaction in a "Transaction Failure" symptom, a particular threshold in a "critical Threshold Exceeded" symptom, etc.

In Table 1, Rows A1 and A2 show the same problem resulting in two different hierarchical levels of abstracted issues.

Row A2 shows a more generalized abstracted issue that does not include the address space subtype. The abstracted issue includes insight that refers to one or more actions taken to resolve the problem along with information about the resolution (e.g., success, the length of time to resolve).

Row B shows two problems that are correlated. The resulting abstracted issue indicates that the two address spaces involved are related as parent and child. The action and resolution are not shown in row B for simplicity, but the insights associated with the combination of the problems can be included in the local database 115.

Row C shows another exemplary problem that is abstracted. Once again, the insight is omitted in Table 1. As row C indicates, the resolution record for the abstracted issue is augmented based on subsequent occurrences of the problem. As Table 1 indicates, an abstracted issue includes the symptoms of the associated problem at a minimum. At different levels of abstraction, the source or location of the symptoms (e.g., address space type) can also be included.

Abstracting the issues at block 206 can include curating previously identified problems, and/or identifying and curating previously encountered problems that are discussed in

TABLE 1

Exemplary problems and anomalies with corresponding abstracted issues.

| | Problem | Abstracted Issue |
|---|---|---|
| A1 | Address Space: {jobname: CI35TLXR, ASID: 4567, Type CICS, Subtype: AOR, HasParent: "MQM2T1XR"} Symptoms: ["Multiple Transaction Failures", "Critical Threshold Exceeded"] | Address Space: {Type CICS, Subtype: AOR} Symptoms: ["Multiple Transaction Failures", "Critical Threshold Exceeded"] Action: ["Resolve issue with parent"] Resolution: [Outcome: successful, Time 5 minutes] |
| A2 | Address Space: {jobname: CI35TLXR, ASID: 4567, Type CICS, Subtype: AOR, HasParent: "MQM2T1XR"} Symptoms: ["Multiple Transaction Failures", "Critical Threshold Exceeded"] | Address Space: {Type CICS} Symptoms: ["Multiple Transaction Failures", "Critical Threshold Exceeded"] Action: ["Resolve issue with parent"] Resolution: [Outcome: successful, Time 5 minutes] |
| B | (1) Address Space: {jobname CI35TLXR, ASID: 4567, Type: CICS, Subtype: AOR, HasParent: "MQM2T1XR"} Symptoms: ["Multiple Transaction Failures", "Critical Threshold Exceeded"] (2) Address Space: {jobname: MQM2TLXR, ASID: 5678, Type: MQ, Subtype: QueueManager, HasChild: "CI35TLXR"} Symptoms: ["Unexpected messages", "MQM234E", "Critical Threshold Exceeded"] | (1) Address Space: {Type: CICS, Subtype: AOR, HasParent: {Type: MQ, Subtype QueueManager}} Symptoms: ["Multiple Transaction Failures", "Critical Threshold Exceeded"] (2) Address Space: {Type: MQ, Subtype: QueueManager, HasChild: {Type: CICS, Subtype: AOR}} Symptoms: ["Unexpected messages", "MQM234E", "Critical Threshold Exceeded"] |
| C | Address Space: {jobname: M23RC45X, ASID: 1234} Symptoms: ["unusually high CPU usage", "no IO activity"] Action: ["Monitor for 15 mins", "Cancel"] Resolution: {Outcome: Successful, Time: 16 minutes} | Symptoms: ["unusually high CPU usage", "no IO activity"] Action: ["Monitor for 15 mins", "Cancel"] Resolution: {Outcome: Successful, Time: 16 minutes}, {Outcome: Reoccurred_After_Restart, Time: 7 minutes}, {Outcome: Successful, Time: 16 minutes} | the public sphere. This aspect of the curating can include performing internet searches and obtaining publications using natural language processing, for example.

Abstracting the issues, at block 206, can also include storing the abstracted issues in the searchable local database 115. As previously noted, the abstracted issues can be stored at different hierarchical levels of abstraction. Along with the abstracted issues, the non-abstracted problems can also be stored in the local database 115. Abstracted problems can be added to the abstract issues in the local database 115. Optionally, the received problem can be added as a non-abstracted problem, as well. When the problem is resolved, the resolution can be added to the local database 115 in correspondence with the abstracted (and non-abstracted) problem for subsequent search. In addition to building the local database 115, abstracting issues facilitates sharing the abstracted issues with analytics engines 105.

Once relevant information is identified by optimization engine 112, optimization engine 112 may curate hierarchical and indexed categories of problems. For example, in the exemplary case of the analytics engine controller 110 being involved in the management of a cluster of computer systems 130, the problems can relate to any components (e.g., computer programs, memory managers) and can relate to topics that include hardware, software, operating systems, address spaces, subsystems, jobs, and error codes. When the optimization engine 112 relates to another type of management, the problems that are identified and curated can be modified to that type of management. In some aspects, non-abstracted problems are also stored in the local database 115.

At block 208, optimization engine 112 obtains anomaly research data based on the abstracted issues, and in some embodiments, the non abstracted issues as well. Accordingly, the research assistant (research optimization engine 112) directs queries to a number of different entities, such as the operating system, other monitoring and automation software, other repositories of system knowledge and other elements of the analytics and cognitive network to help identify the entities involved in the anomaly and the environment in which the anomaly occurred.

In one embodiment, obtaining the anomaly research data can include receiving a plurality of data sources, data types, and/or data formats that include one or more data lake in a computing system. A data lake, as used herein, refers to an aggregation of data. Such data could be stored or streamed, and may be heterogeneous in nature. For example, a data type or a data format coming from a data lake may come from any number of a plurality of data sources, and may be destined for any number of a plurality of destinations.

In one aspect, obtaining the anomaly research data includes obtaining system information, historical operation data, and system response data. Each category of anomaly research data is separately discussed below.

In one embodiment, obtaining system information includes retrieving one or more of a host identification, a host location, cluster data indicative of two or more mainframes acting together as a single system image, and a hardware association between one or more of the mainframes and the problem in the computing system.

In another embodiment, obtaining system information can also include retrieving, via the research optimization engine, address space details that include one or more responses to a display command associated with the anomaly, and querying an address space host for address space information in response to obtaining the one or more responses to the display command.

In yet another embodiment, identifying historical operation data includes identifying the anomaly associated with the problem in the computing system, and retrieving, via research optimization engine 112, one or more anomaly details from a knowledge base. In some aspects, analytics engine controller 110 may provide information to one or more analytics engines 105 about the anomaly details, and/or any resolution(s) stored in correspondence with the identified anomaly.

In another embodiment, retrieving historical operation data can further include retrieving system log information. In one aspect, the system log information is contemporaneous with an occurrence of the anomaly. In another aspect, optimization engine 112 can filter the system log information to identify and sequester only data associated with the anomaly and contemporaneous with the occurrence of the anomaly. Optimization engine 112 then retrieves only the filtered system log information.

Optimization engine 112 may also determine whether a system abend (i.e., a system dump) associated with the anomaly has occurred. If an abend has occurred, optimization engine 112 may obtain information associated with the system abend. In some aspects, the information associated with the abend can include a location of the system abend, and/or a fault analysis report.

According to another embodiment, the optimization engine 112 obtains system response data. This can include obtaining one or more of a process identification number, a job name, a primary procedure, a start parameter, an application classification, an application type, an application level, and a maintenance level. Optimization engine 112 may obtain the system response data by retrieving the process information from an operating system via heuristics.

In another aspect, optimization engine 112 retrieves the process information from an asset discovery engine. The process information includes historical data associated with a system experiencing the problem and a software running on the system experiencing the problem. According to some embodiments of the present invention, the historical data includes one or more particular operation system settings, and/or a software associated with that particular operating system setting. In one aspect, the historical data can provide one or more recorded system responses associated with the particular operating system setting or software over a predetermined period of time. A predetermined period of time may be, for example, an hour, a day, a week, a month, etc.

In another exemplary embodiment, optimization engine 112 obtains the system response data by retrieving cross definition information that indicates one or more processes associated with the anomaly. Optimization engine 112 may also identify one or more actions taken by a system processor responsive to a detection and a resolution of the anomaly, and identify one or more outcomes associated with the respective actions.

The research process described with respect to block 208 is iterative nature such that, with each level of discovery, optimization engine 112 opens up more options for further discovery. Accordingly, optimization engine 112 is driven by an opportunistic data driven mechanism, and not a sequential procedural mechanism.

In some embodiments of the present invention, optimization engine 112 operates under a predetermined time limit. A predetermined time may be, for example, from 1 to 3 seconds. In other aspects, the predetermined time limit for research may be less (e.g., ½ second to 2 seconds), or it may be more (e.g., 2 seconds to five seconds).

After describing the various ways optimization engine 112 can obtain anomaly research data as shown in block 208, we next consider how optimization engine 112 associates abstracted issues with the anomaly research data, as represented in block 210. At block 210, optimization engine 112 associates the abstracted issues with anomaly research data. In some aspects, optimization engine 112 may hypothesize a correlation. This can include the optimization engine 112 postulating a connection between two or more problems that are reported individually. This hypothesizing can use the curated problems recorded in local database 115, as well as the received problems abstracted in block 106. Accordingly, in previous iterations of the present method, optimization engine 112 may have archived the problem (during a previous iteration at block 260) and, when a solution was implemented, the solution was stored in correspondence with the problem in the local database 115. Accordingly, optimization engine 112 may postulate a connection two or more reported problems, any one or more problems, and one or more abstracted issues, and/or the one or abstracted issues correlated with the associated solutions.

Optimization engine 112 can hypothesize a correlation based on several factors in addition to temporal coincidence. Even temporal coincidence alone can suggest a high correlation if it occurs repeatedly and consistently. That is, for example, if two problems occur and are resolved at the same time, each occurrence of the coincidence can raise the correlation score or level associated with the correlation of those two problems. While a single occurrence of a temporal coincidence of the problems can suggest a low level or score of correlation, other factors can suggest a stronger correlation.

For example, when two problems are associated with two computer programs and one of the computer programs is dependent on the other computer program, a hypothesis can be made that the two problems are correlated. In addition to a direct interaction between two or more components (e.g., computer programs, address spaces, etc.) that are experiencing a problem, there can be a competition for the same resource among the two or more components that are experiencing a problem. As the examples indicate, the hypothesis of a correlation among problems can require knowledge (e.g., the interaction between components, dependence among components, resources required by each of the components) that is additional to the knowledge included in the problem report. Thus, in order to hypothesize a correlation, optimization engine 112 can obtain additional information from the resource database 140. This information can include relationships between the sources or locations (e.g., computer programs, memory addresses) of the problems and resources requested by the sources of the problems. The source of a problem is understood to be the computer program, memory address, or other component that is experiencing the problem and which is identified in the problem description.

Depending on the number of problem descriptions that are received and the additional information that is obtained from optimization engine 112, more than one hypothesis may be generated. For example, two problems can exhibit a dependence that leads to a hypothesis of a strong correlation while a third problem can be hypothesized to be weakly correlated with the two problems because it temporally coincides with the occurrence of the two problems.

At block 212, optimization engine 112 may assign one or more abstracted issues and the corresponding anomaly research data retrieved that is associated with that abstracted issue, to at least one of the plurality of analytics engines. The assignments may be driven, for example, by the one or more hypotheses discussed above.

Figure 2B:
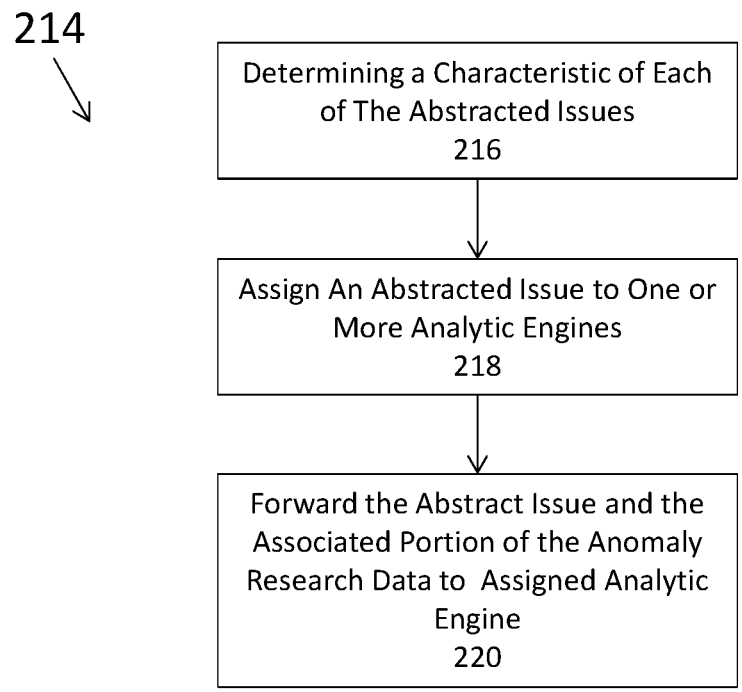
FIG. 2B is a process flow of a computer-implemented method for assigning one or more abstracted issues and associated data to the analytics engines according to embodiments of the present invention.

In other aspects, optimization engine 112 also assigns abstracted issues to particular analytics engines that are predisposed for computing that particular type of problem. FIG. 2B depicts a process flow of a computer-implemented method for assigning one or more abstracted issues to the analytics engines, according to embodiments of the present invention.

Referring now to FIG. 2B, in block 216, optimization engine 212 determines a characteristic of each of the one or more abstracted issues. Accordingly, as shown in block 216, optimization engine may determine a characteristic of each of the abstracted issues, then assign an abstracted issue to one or more analytics engines configured to fix problems associated with the one or more abstracted issue.

Assigning abstracted issues and associated anomaly research data to analytics engines for analysis can include determining, with optimization engine 112, a characteristic of each of the abstracted issues. A characteristic of an abstracted issue can include, for example, a field of business (e.g., banking, data analysis, etc.), a type of problem (e.g., memory allocation issues, key generation and data encryption, etc.), and/or a particular solution, etc. Accordingly, optimization engine 112 may assign an analytics engine (any of analytics engines 105) configured to fix problems associated with the characteristic of the abstracted issue.

Optimization engine 112 also has knowledge of a predetermined specialty of analysis associated with each of the analytics engines 105. For example, one analytics engine may be configured to diagnose, detect, and/or fix problems concerning an address space for mixed language application servers providing online transaction management and connectivity for applications. In some aspects, optimization engine 112 assigns an abstracted issue of that sort to the analytics engine configured to analyze such a problem. Optimization engine 112 may make matches with the abstracted issue based on the characteristic of the issue.

At block 220 optimization engine forwards the abstracted issue and the one or more associated portions of the anomaly research data to the analytics engine configured to fix problems associated with the abstracted issue. The anomaly research data forwarded includes a problem report (depicted in FIG. 3B) that describes the abstracted issue after analysis by the research optimization engine 112.

Figure 3B:
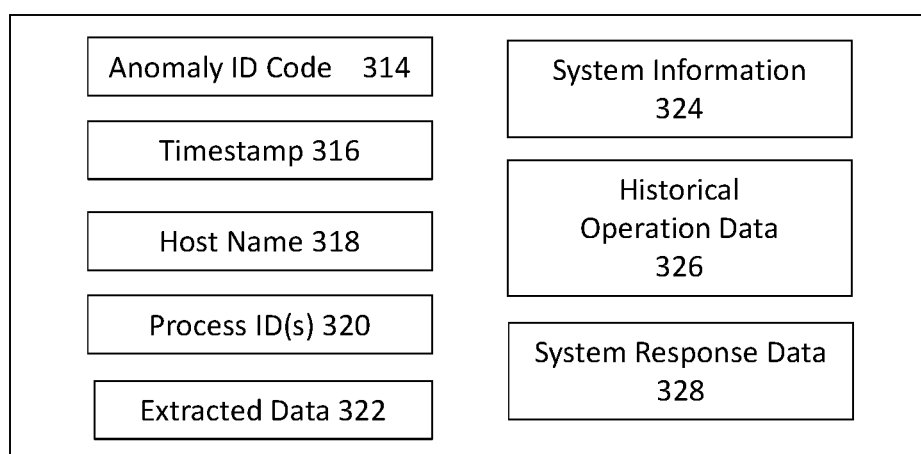
FIG. 3B is a block diagram of an exemplary problem report after analysis by the research optimization engine of FIG. 1 according to embodiments of the present invention.

FIG. 3B is a block diagram of a forwarded problem report 312 after analysis by research optimization engine 112, according to embodiments of the present invention. Referring now to FIG. 3B, problem report 312 can include, for example, various portions of information that describe a computing problem in a computing system (similar to those depicted in FIG. 3A). As shown in FIG. 3B, problem report 312 includes an anomaly identification (ID) 314 indicating a known anomaly that causes a particular problem in a computing system. In other aspects, the symptoms can include a timestamp 316 of the anomaly, a host name 318 of the system experiencing the anomaly and/or the one or more process ID(s) 320 that were running on the host system during an occurrence of the anomaly. In other aspects, the symptoms may be embodied in the extracted data 322 that may be included in problem report 312. In addition, problem report 312 can include one or more of system information 324, historical operation data 326, and system response data 328, which were the result of one or more operations described with respect to blocks 206-218. The problem report in FIG. 3B is exemplary only. Embodiments of the present invention may include some, all, and/or additional information.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While an embodiment of the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 4:
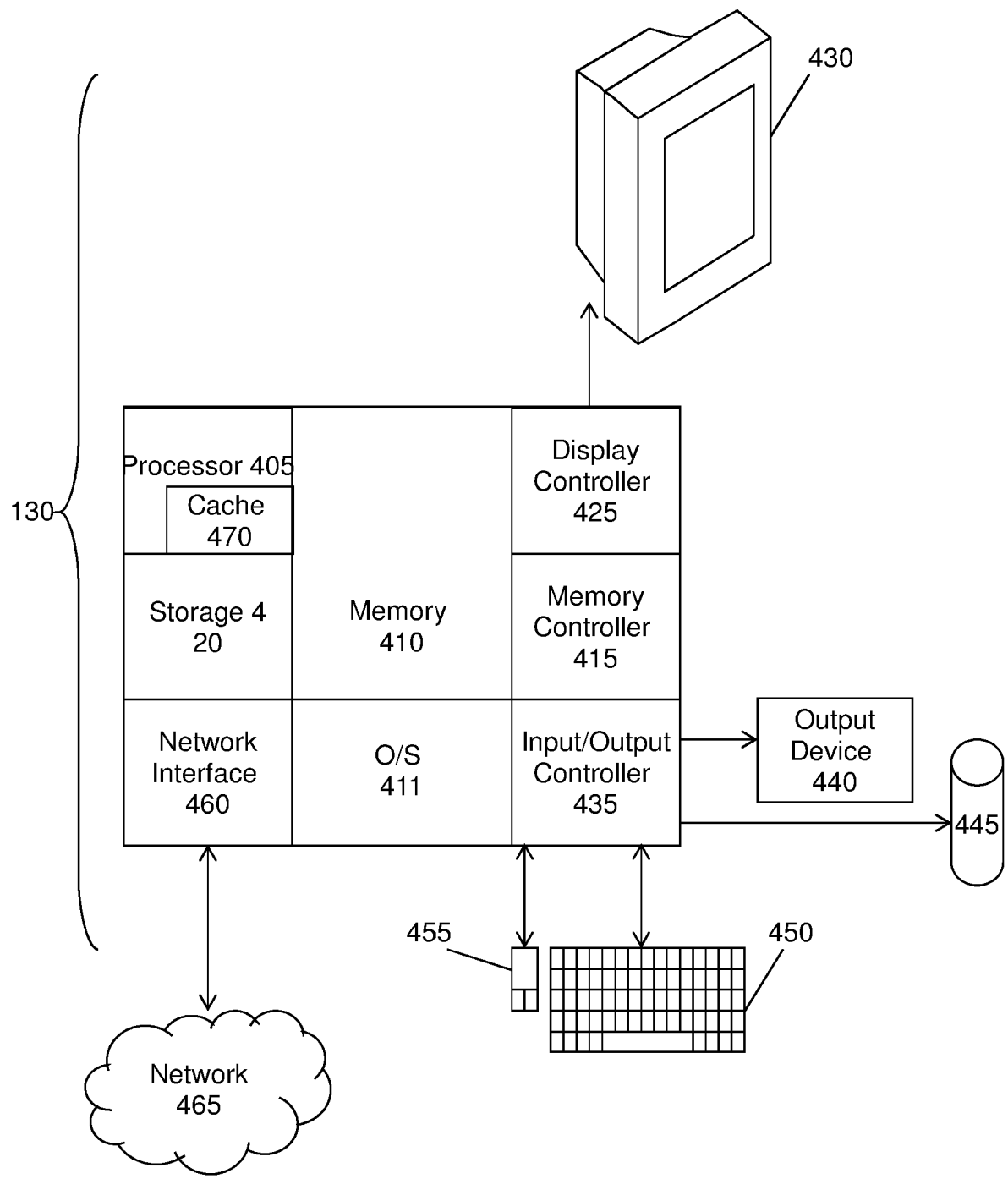
FIG. 4 is a block diagram of an exemplary implementation of a computer system performing the functionality of the research optimization engine of FIG. 1 according to embodiments of the present invention.

The analytics engines 105 and analytics engine controller 110 can be part of one or more of the computer systems 130 that carry out the functionality of the enterprise applications. One or more analytics engines 105 and the analytics engine controller 110 can, instead, be part of a separate computer system 130. In some embodiments, as shown in FIG. 4, the computer system 130 includes a processor 405, memory 410 coupled to a memory controller 415, and one or more input devices 445 and/or output devices 440, such as peripherals, that are communicatively coupled via a local I/O controller 435. The input devices 445 and output devices 440 can facilitate communication with the other databases 150, for example. These devices 440 and 445 can include, for example, a printer, a scanner, a microphone, and the like. Input devices such as a conventional keyboard 450 and mouse 455 can be coupled to the I/O controller 435. The I/O controller 435 can be, for example, one or more buses or other wired or wireless connections, as are known in the art. The I/O controller 435 can have additional elements, which are omitted for simplicity, such as controllers, buffers (caches), drivers, repeaters, and receivers, to enable communications.

The I/O devices 440, 445 can further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 can be a custom made or commercially available processor, a central processing unit (CPU), an auxiliary processor among several processors associated with the computer system 130, a semiconductor based microprocessor (in the form of a microchip or chip set), a macroprocessor, or other device for executing instructions. The processor 405 includes a cache 470, which can include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 can be organized as a hierarchy of more cache levels (L1, L2, etc.).

The memory 410 can include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 can incorporate electronic, magnetic, optical, or other types of storage media. Note that the memory 410 can have a distributed architecture, where various components are situated remote from one another but can be accessed by the processor 405.

The instructions in memory 410 can include one or more separate programs, each of which comprises an ordered listing of executable instructions for implementing logical functions. In the example of FIG. 4, the instructions in the memory 410 include a suitable operating system (OS) 411. The operating system 411 essentially can control the execution of other computer programs and provides scheduling, input-output control, file and data management, memory management, and communication control and related services.

Additional data, including, for example, instructions for the processor 405 or other retrievable information, can be stored in storage 420, which can be a storage device such as a hard disk drive or solid state drive. The stored instructions in memory 410 or in storage 420 can include those enabling the processor to execute one or more aspects of the analytics engine controller 110 and methods of this detailed description.

The computer system 130 can further include a display controller 425 coupled to a monitor 430. In some embodiments, the computer system 130 can further include a network interface 460 for coupling to a network 465. The network 465 can be an IP-based network for communication between the computer system 130 and an external server, client and the like via a broadband connection. The network 465 transmits and receives data between the computer system 130 and external systems. In some embodiments, the network 465 can be a managed IP network administered by a service provider. The network 465 can be implemented in a wireless fashion, e.g., using wireless protocols and technologies, such as WiFi, WiMax, etc. The network 465 can also be a packet-switched network such as a local area network, wide area network, metropolitan area network, the Internet, or other similar type of network environment. The network 465 can be a fixed wireless network, a wireless local area network (LAN), a wireless wide area network (WAN) a personal area network (PAN), a virtual private network (VPN), intranet or other suitable network system and can include equipment for receiving and transmitting signals.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for optimizing research of an abstracted issue with a plurality of analytics engines, the method comprising:
   receiving, via an analytics engine controller, a problem report comprising one or more symptoms of a problem in a computing system;
   forwarding the problem report via the analytics engine controller to a research optimization engine;
   abstracting, via the research optimization engine, one or more issues associated with the problem based on the one or more symptoms of the problem;
   obtaining, via the research optimization engine, anomaly research data about an anomaly for one or more of diagnosing the problem and fixing the problem, wherein the anomaly research data is based on the one or more abstracted issues;
   associating, via the research optimization engine, the one or more abstracted issues with one or more portions of the anomaly research data; and
   assigning, via the research optimization engine, the one or more abstracted issues and the one or more associated portions of the anomaly research data to at least one of the plurality of analytics engines.

2. The computer-implemented method according to claim 1, wherein assigning the one or more abstracted issues and the one or more associated portions of the anomaly research data to at least one of the plurality of analytics engines comprises:
   determining, via the research optimization engine, a characteristic of each of the one or more abstracted issues;
   assigning an abstracted issue of the one or more abstracted issue to an analytics engine configured to fix problems associated with the one or more abstracted issue based on the characteristic; and
   forwarding the abstracted issue and the one or more associated portions of the anomaly research data to the analytics engine configured to fix problems associated with the abstracted issue.

3. The computer-implemented method according to claim 1, wherein obtaining the anomaly research data comprises:
   receiving, via the analytics engine controller, a plurality of data sources and data types and data formats comprising one or more data lake in a computing system; and
   obtaining system information, historical operation data, and system response data.

4. The computer-implemented method according to claim 3, wherein obtaining system information comprises:
   retrieving, via the research optimization engine, host information comprising one or more of:
   a host identification, a host location, cluster data indicative of two or more mainframes acting together as a single system image, and a hardware association between one or more of the mainframes and the problem in the computing system.

5. The computer-implemented method according to claim 4, wherein obtaining system information further comprises:
   retrieving, via the research optimization engine, address space details comprising one or more responses to a display command associated with the anomaly; and
   querying an address space host for address space information responsive to obtaining the one or more responses to the display command.

6. The computer-implemented method according to claim 3, wherein obtaining historical operation data comprises:
   identifying, via the research optimization, the anomaly associated with the problem in the computing system; and
   retrieving, via the research optimization engine, one or more anomaly details from a knowledge base.

7. The computer-implemented method according to claim 6, wherein obtaining historical operation data further comprises:
   retrieving, via the research optimization engine, system log information, wherein the system log information is cotemporaneous with an occurrence of the anomaly.

8. The computer-implemented method according to claim 7, wherein obtaining historical operation data further comprises:
   filtering, via the research optimization engine, the system log information by identifying and sequestering only data associated with the anomaly and cotemporaneous with the occurrence of the anomaly; and
   retrieving the filtered system log information.

9. The computer-implemented method according to claim 7, wherein obtaining historical operation data further comprises:
   determining, via the research optimization engine, whether a system abend associated with the anomaly has occurred; and
   responsive to determining that the system abend has occurred, obtaining information associated with the system abend.

10. The computer-implemented method according to claim 9, wherein the information associated with the abend comprises one or more of a location of the system abend, and a fault analysis report.

11. The computer-implemented method according to claim 3, wherein obtaining the system response data comprises:
   obtaining, via research optimization engine, process information comprising one or more of a process identification number, a job name, a primary procedure, a start parameter, an application classification, an application type, an application level, and a maintenance level.

12. The computer-implemented method according to claim 11, wherein obtaining the system response data comprises retrieving the process information from an operating system via heuristics.

13. The computer-implemented method according to claim 12, wherein obtaining the system response data comprises retrieving the process information from an asset discovery engine,
   wherein the process information comprises historical data associated with a system experiencing the problem and a software running on the system experiencing the problem.

14. The computer-implemented method according to claim 11, wherein obtaining the system response data further comprises:
   retrieving, via the research optimization engine, cross definition information indicating one or more processes associated with the anomaly.

15. The computer-implemented method according to claim 14, wherein retrieving the cross definition information comprises:
   identifying one or more actions taken by a system processor responsive to a detection and a resolution of the anomaly; and
   identifying one or more outcomes associated with the one or more actions taken by the system processor.

16. The computer-implemented method according to claim 1, wherein the problem report comprises one or more of:
   an anomaly identification code;
   a timestamp of the anomaly;
   a host name indicative of a name of a host associated with the anomaly;
   one or more process identifications; and
   extracted data from one or more data streams associated with the anomaly,
   wherein the one or more symptoms of the problem are derivable from the problem report.

17. A system for optimizing research of an abstracted issue for a plurality of analytics engines, the system comprising:
   a plurality of analytics engines; and
   a processor running an analytics optimization engine, the analytics optimization engine operatively connected to the plurality of analytics engines, the processor configured to:
      receive a problem report comprising one or more symptoms of a problem in a computing system;
      receive a plurality of data sources and data types and data formats comprising one or more data lake in a computing system;
      abstract one or more issues associated with the problem based on the one or more symptoms of the problem;
      obtain anomaly research data about an anomaly for one or more of diagnosing the problem and fixing the problem, wherein the anomaly research data is based on the one or more abstracted issues;
      associate the one or more abstracted issues with one or more portions of the anomaly research data; and
      assign the one or more abstracted issues and the one or more associated portions of the anomaly research data to at least one of the plurality of analytics engines.

18. The system according to claim 17, wherein, after obtaining the anomaly research data based on the one or more abstracted issues, the processor is configured to:
   determine a characteristic of each of the one or more abstracted issues;
   associate the one or more abstracted issues with one or more portions of the anomaly research data;
   assign an abstracted issue of the one or more abstracted issue to an analytics engine configured to fix problems associated with the one or more abstracted issue; and
   forward the abstracted issue and the one or more associated portions of the anomaly research data to the analytics engine configured to fix problems associated with the abstracted issue.

19. A computer program product for optimizing research of an abstracted issue for a plurality of analytics engines, the computer program product comprising a non-transitory computer readable storage medium having program instructions embodied therewith, the program instructions executable by a via an analytics engine controller operating a research optimization engine to cause the processor to perform a method comprising:
   receiving a problem report comprising one or more symptoms of a problem in a computing system;
   forwarding the problem report to a research optimization engine;
   abstracting one or more issues associated with the problem based on the one or more symptoms of the problem;
   obtaining information about an anomaly for one or more of diagnosing the problem and fixing the problem, wherein the anomaly research data is based on the one or more abstracted issues;
   associating the one or more abstracted issues with one or more portions of the anomaly research data; and
   assigning the one or more abstracted issues and the one or more associated portions of the anomaly research data to at least one of the plurality of analytics engines.

20. The computer program product according to claim 19, wherein assigning the one or more abstracted issues and the one or more associated portions of the anomaly research data to at least one of the plurality of analytics engines comprises:
   determining a characteristic of each of the one or more abstracted issues;
   assigning an abstracted issue of the one or more abstracted issue to an analytics engine configured to fix problems associated with the one or more abstracted issue; and
   forwarding the abstracted issue and the associated portion the one or more associated portions of the anomaly research data to the analytics engine configured to fix problems associated with the abstracted issue.

* * * * *